May 23, 1972 A. B. AMIDON ETAL 3,664,834

MIGRATION IMAGING METHOD EMPLOYING ADHESIVE TRANSFER MEMBER

Filed Dec. 23, 1968

INVENTORS
JOAN R. EWING
ALAN B. AMIDON
BY NICHOLAS L. PETRUZELLA
JOSEPH G. SANKUS.

David C. Petre
ATTORNEY 3,664,834

MIGRATION IMAGING METHOD EMPLOYING ADHESIVE TRANSFER MEMBER

Alan B. Amidon, Penfield, and Joseph G. Sankus, Fairport, N.Y., Nicholas L. Petruzzella, Columbus, Ohio, and Joan R. Ewing, Rochester, N.Y., assignors to Xerox Corporation, Rochester, N.Y.

Filed Dec. 23, 1968, Ser. No. 786,867
Int. Cl. G03g 13/16
U.S. Cl. 96—1.4 20 Claims

ABSTRACT OF THE DISCLOSURE

An imaging member comprising a supporting substrate and an overlayer on said substrate comprising a soluble, electrically insulating binder layer containing particles dispersed in said soluble binder is processed to substantially completely remove said soluble binder and form an image and a background pattern of particles on said substrate, which is then contacted with a transfer member which is then stripped away whereby the image or the background pattern of migrate particles is selectively released to said transfer member.

BACKGROUND OF THE INVENTION

This invention relates in general to imaging, and more specifically to a new strip imaging system.

There has recently been developed a migration imaging system capable of producing high quality images of high density, continuous tone, and high resolution, an embodiment of which is described in copending application Ser. No. 460,377, filed June 1, 1965, now U.S. Pat. No. 3,520,681. Generally according to an embodiment thereof, an imaging member comprising a substrate with a layer of softenable or soluble material, containing electrically photosensitive particles overlying the substrate is imaged in the following manner: a latent image is formed on the member, for example, by uniformly electrostatically charging and exposing it to a pattern of activating electromagnetic radiation. The imaging member is then developed by exposing it to a solvent which softens and dissolves the softenable layer. The electrically photosensitive particles which have been exposed to radiation migrate through the softenable layer as it is softened and dissolved, leaving an image of migrated particles corresponding to the radiation pattern of an original, on the substrate. The image may then be fixed to the substrate. For many preferred photosensitive particles, the image produced by the above process is a negative of a positive original. Those portions of the electrically photosensitive material which do not migrate to the conductive substrate may be washed away by the solvent with the softenable layer. As disclosed therein, by other developing techniques, the softenable layer may at least partially remain behind on the substrate.

In general, two basic imaging members may be used: a layered configuration which comprises a substrate coated with a layer of softenable material, and a fracturable and preferably particulate layer of electrically photosensitive material at or embedded near the upper surface of the softenable layer; and a binder structure in which the electrically photosensitive particles are dispersed in the softenable layer which overcoats a substrate.

This imaging system generally comprises a combination of process steps which includes forming a latent image and developing with a solvent liquid or vapor, or heat or combinations thereof to render the latent image visible. In certain methods of forming the latent image, non-photosensitive or inert, particulate layers and material may be used to form images as described in copending application Ser. No. 483,675, filed Aug. 30, 1965, wherein a latent image is formed by a wide variety of methods including charging in image configuration through the use of a mask or stencil or first forming such a charge pattern on a separate photoconductive insulating layer according to conventional xerographic reproduction techniques and then transferring this charge pattern to the members hereof by bringing the two layers into very close proximity and utilizing breakdown techniques as described, for example, in Carlson Patent 2,982,647 and Walkup Patents 2,825,814 and 2,937,943. In addition, charge patterns conforming to selected, shaped, electrodes or combinations of electrodes may be formed by the "TESI" discharge technique as more fully described in Schwertz Patents 3,023,731 and 2,919,967 or by techniques described in Walkup Patents 3,001,848 and 3,001,849, as well as by electron beam recording techniques, for example, as described in Glenn Patent 3,113,179.

The characteristics of the images produced by this new system are dependent on such process steps as charging, exposure, and development, as well as the particular combination of process steps. High density and high resolution are some of the image characteristics possible. The image is generally characterized as a fixed or unfixed particulate image with or without a portion of the softenable layer and unmigrated particles left on the imaged member, which can be used in a number of applications such as microfilm, hard copy and optical masks.

Imaging with the binder member as described above and as further described in copending application Ser. No. 634,757, filed Apr. 28, 1967 now abandoned is not completely satisfactory in all circumstances, since it is found that the images produced often exhibit relatively high background levels, which of course decreases optical contrast. In the parlance of this new imaging system, high background means that the particles in the binder did not migrate exclusively in imagewise configuration but only predominantly so, with some migration of particles also occurring in corresponding background portions of the imaging member.

Thus, there is a continuing need for a better migration imaging system utilizing the binder members described herein to produce high contrast and low background images.

SUMMARY OF THE INVENTION

It is, therefore, an object of this invention to provide an imaging system which overcomes the above-noted deficiencies and satisfies the above-noted wants.

It is a further object of this invention to provide a novel strip imaging system capable of simultaneously yielding complementary positive and negative images.

It is a still further object of this invention to provide an imaging system to produce lithographic duplicating masters.

It is a still further object of this invention to provide an imaging system which makes it possible to use a wide range of electrically insulating substrates in the makeup of binder migration imaging members.

It is a still further object of this invention to provide a strip imaging system producing complementary positive and negative images which are at least partially fixed.

It is a still further object of this invention to provide an imaging system to make high quality colored projection transparencies and lantern slides.

The foregoing objects and others are accomplished in accordance with this invention by providing an imaging member comprising a supporting substrate and an overlayer on said substrate comprising a soluble, electrically insulating binder layer containing particles, and in a preferred embodiment hereof, electrically photosensitive particles, dispersed in said soluble binder which is processed to substantially completely remove said soluble binder and form an image and a background pattern of particles on said substrate which is then contacted with a transfer member which is then stripped away whereby the image or the background pattern of migrated particles is selectively released to said transfer member.

With proper adjustment of heat, pressure, adhesiveness of the transfer member and other parameters during the contact of the transfer member to the migrated particle bearing substrate, (a) The image pattern may be transferred upon stripping and the background left on the substrate;

(b) Both the image and the background may be transferred to the transfer member; or, (c) The image may be left on the substrate with the background transferred. (a) and (c) produce the preferred results of complementary positive and negative images after stripping with (c) being the optimum mode herein because the high quality images produced particularly on transparent substrates are directly viewable and may also be used as projection transparencies.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figures 1, 2A, 2B, 3A, 3B:
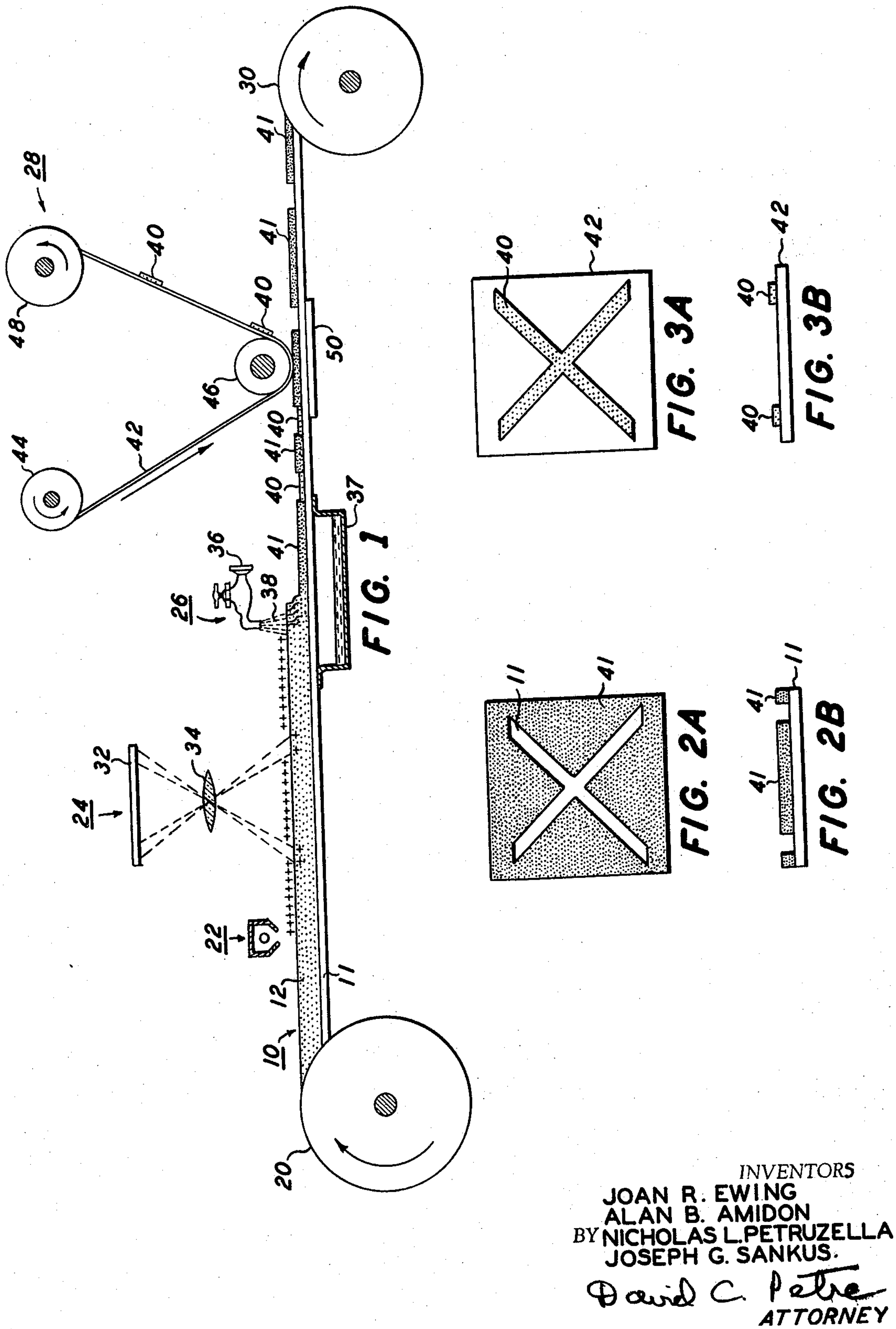
FIG. 1 is a partially schematic representation of a preferred mode of the strip out imaging system according to the invention.
FIGS. 2A and B illustrate the resulting image formation on substrate 11 of the developed imaging member according to an embodiment of the invention, in plan and section, respectively, after the developed imaging member and transfer member have been stripped apart.
FIGS. 3A and B illustrate the resulting image formation on the transfer member 42 according to the same embodiment of the invention illustrated in FIGS. 2A and B, in plan and section, respectively, after the developed imaging member and transfer member have been stripped apart.

Referring now to FIG. 1, there is illustrated imaging member 10 in the form of a continuous web which passes from supply roller 20 successively past charging means 22, exposure means 24, developing means 26 and strip out station 28 to takeup roll 30.

Member 10 includes substrate 11 which may be electrically conductive or insulating but which possesses sufficient mechanical strength to support overlayer 12. Substrate 11 may conveniently be a metallic sheet, web, foil, cylinder, plate or the like, glass, paper, conductively coated paper or plastic films and the like. Soluble layer 12 may be coated directly onto substrate 11 or alternatively, the soluble layer may be self-supporting and may be brought into contact with a suitable substrate during imaging.

Over substrate 11 is the thin layer 12 of electrically insulating soluble material containing electrically photosensitive particles dispersed therein. Preferably, the particles are substantially uniformly dispersed in the soluble layer. The soluble layer may be of any suitable thickness, with thicker layers generally requiring a greater corona potential during the charging step, to be described. In general, thicknesses from about ¼ to about 5 microns have been found to be preferred with a thickness of from about 1 to about 2 microns being found to be optimum to produce optimum quality images.

The electrically photosensitive particles, portions of which migrate to the substrate during image formation, may comprise any suitable electrically photosensitive particles which are not readily soluble in the solvent liquids for the binder of layer 12 used to develop the member as will be described. Preferably the particles should be between about 0.01 to about 3 microns in size and optimally about 0.5 to about 1.0 micron in size for optimum resolution and otherwise high quality images according to this invention.

Electrically photosensitive particles as used herein refers to any particles which when dispersed in a soluble, electrically insulating binder layer as described herein, in response to electrical charging, imagewise exposure to activating radiation and solvent contact are caused to selectively deposit in image configuration on a substrate.

While photoconductive particles (and "photoconductive" is used in its broadest sense to mean particles which show increased electrical conductivity when illuminated with electromagnetic radiation and not necessarily those which have been found to be useful in xerography in xerographic pigment-binder plate configurations) have been found to be a class of particles useful as "electrically photosensitive" particles in this invention and while the photoconductive effect is often sufficient in the present invention to provide an "electrically photosensitive" particle it does not appear to be a necessary effect. The necessary effect according to the invention is the selective relocation of charge into, within or out of the particles, said relocation being effected by light action on the bulk or the surface of the "electrically photosensitive" particle, by exposing said particle to activating radiation; which may specifically include photoconductive effects, photoinjection, photoemission, photochemical effects and others which cause said selective relocation of charge.

Any suitable electrically photosensitive particulate material may be used herein. Typical such materials include inorganic or organic photoconductive insulating materials.

Phthalocyanine pigment/binder systems for layer 12 using phthalocyanine (which includes its metal derivatives) pigments as described in copending application Ser. No. 518,450, filed Jan. 3, 1966 and in Byrne et al. Pat. 3,357,989 are found to be preferred for use herein in layer 12 because of the excellent migration images resulting from members constructed of such pigments. Hexagonal selenium pigment binder layers as described in copending application Ser. No. 669,915, filed Sept. 22, 1967:

Golden Yellow RK (with a C.I. of 59105, from American Hoechst Chem. Corp., which is a bromated 3,4,8,9-dibenzpyrenequinone), mainly blue light sensitive with a formula

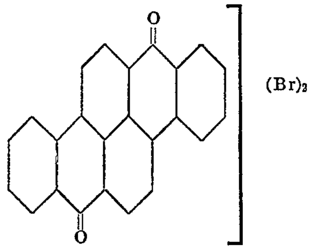

Indofast Orange Toner with a C.I. of 71105 from Harmon Colors, which is imidazole type pigment, mainly green light sensitive with a formula

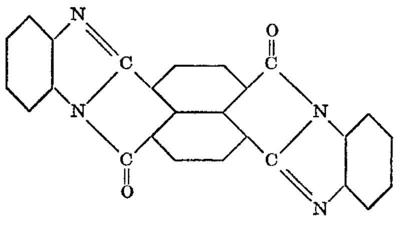

Bordeaux RRN with a C.I. of 71100 from American Hoechst Chem. Corp., which is an imidazole type pigment, mainly green light sensitive with a formula

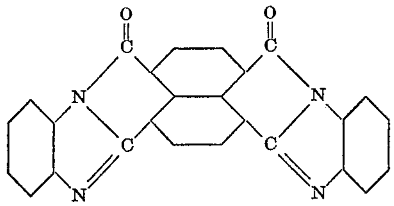

Anthanthrone from K & K Laboratories mainly ultraviolet sensitive with a formula

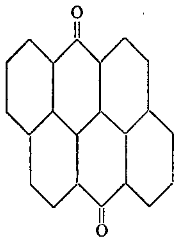

Indofast Yellow with a C.I. of 70600 from Harmon Colors, a flavanthrone pigment, mainly blue light sensitive with a formula

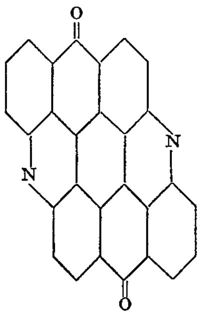

and Indofast Brilliant Scarlet R–6300 with a C.I. of Pigment Red 123 from Harmon Colors, a perylene pigment, mainly blue green light sensitive with a formula

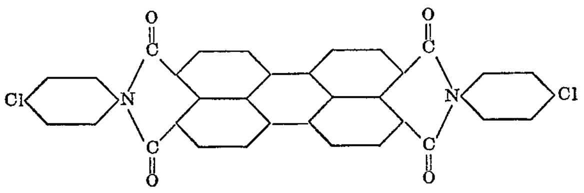

are also found to be preferred electrically photosensitive pigments for use herein.

The first processing step according to the invention is to form a latent image on member 10. This image is illustratively formed as shown in the preferred mode in FIG. 1 employing electrically photosensitive particles in layer 12 of member 10, by uniformly electrostatically charging the member, in the substantial absence of activating radiation, by means 22 and then exposing the member by means 24 to a pattern of light and shadow from an original 32 to be reproduced.

A wide variety of charging systems have been evolved over the years, including those useful in the art of xerography, varying from vigorously rubbing the surface of the layer with a soft brush or a fur to more sophisticated corona charging techniques. The corona charging technique is convenient, works well and is thus preferred. For example, corona discharge devices of the general description and generally operated as disclosed in Vyverberg Patent 2,836,725, an embodiment of which is shown as charging means 22, and Walkup Patent 2,777,957 have been found to be excellent sources of corona useful in the charging of imaging member 10 according to the invention.

When substrate 11 is an insulating material, charging of the member, for example, may be accomplished by placing the insulating substrate in contact with a conductive member and charging it as illustrated in FIG. 1. However, a preferred technique herein wherein an insulating substrate is used is double sided corona charging where a total of two corona discharging devices, one on each side of the member and oppositely charged are traversed in register relative to member 10. Disposing the positive corotron adjacent layer 12 and the negative corotron adjacent the insulating substrate has been found to give optimum results.

After charging, the web moves beneath exposure means 24 whereat a light and shadow pattern of an original 32 to be reproduced is projected onto the web surface by means of lens 34 desirably operating in conjunction with any suitable conventional web exposure mechanism (not shown) both synchronized to the motion of the web.

While the preferred optical mode hereof of forming a latent image has just been described, any suitable method of forming a latent image on members hereof are included in the invention. Other methods of forming a latent image on member 10 include corona charging through a stencil as shown in aforementioned application 483,675, or forming a latent image by the other means described therein where the particles in layer 12 need not be (but may be) electrically photosensitive. Another mode of optically forming a latent image is to use a member comprising a photoconductive soluble layer and particles which need not be electrically photosensitive as more fully described in copending application Ser. No. 553,837, filed May 31, 1966 now abandoned. Also, the process steps of optically forming a latent image on members hereof may be manipulated to produce positive or negative migration images from a positive optical image, for example, as described in copending application Ser. No. 635,096, filed May 1, 1967 now abandoned.

The latent image is then rendered visible or developed by developing means 26 comprising source 36 for liquid solvent 38 for the soluble binder material of layer 12. In solvent liquid development, the solvent is at least briefly contacted with layer 12. Tank 37 may serve to collect excess solvent.

The solvent should preferably be a solvent for the soluble binder material but not for the particles and the substrate and be sufficiently electrically insulating to prevent the particles from losing their charge before reaching the substrate.

The developing time is typically for a relatively short period, commonly from about 0.1 to 5 seconds, during which time, typically, the electrically photosensitive particles in the previously charged portions of layer 12 which have not been exposed to radiation migrate through the soluble layer as it is softened and dissolved away, the particles adhering to the substrate 11 in positive image configuration, assuming a positive original, indicated as raised portions 41 of predominantly closely packed particles on substrate 11 in FIG. 1. The areas of the electrically photosensitive binder layer 12 which have been exposed do not migrate, at least as predominantly as the unexposed portions, and a substantially greater portion of these particles are washed away with the soluble binder 12 in the solvent to cause, optimally, no deposition of particles on the substrate corresponding to the exposed areas of the electrically photosensitive layer. But more often as found in actual practice and as is illustrated in FIG. 1, a lesser amount of background particles are caused to migrate to the substrate illustrated by the lower plateau regions 40 in FIG. 1, the background portions 40 forming a negative image, assuming a positive original. Portions 40 and 41 may or may not be of the same depth (FIG. 1 showing thinner portions 40) but are characterized by portions 41 having substantially greater particle concentration than portions 40.

A more detailed disclosure of this mode of development and the materials including electrically photosensitive and non-photosensitive particles, soluble materials, solvents, substrates, and so on; and binder imaging member construction variations to member 10 may be found in the aforementioned copending application Ser. No. 634,757.

As described therein, development of the imaging members hereof may be accomplished by treatment with various combinations of liquid solvent or vapor or heat. The liquid solvent mode of development is preferred herein because of its simplicity in producing both end results of a migration image and in substantially completely removing the soluble binder of layer 12, which are preferred results for optimum quality images according to the invention but any mode of development which produces these two preferred end results may be used.

For example, forming a latent charge image and softening (but not dissolving away) the binder of layer 12 by solvent vapor, heat or a quick dip in liquid solvent without a subsequent wash-away step produces a usable migration image, and although layer 12 is not thereby washed away, the image produced may be viewed by means of special display techniques, including, for example, focusing light reflected from the plate onto a viewing screen. Moreover, a liquid solvent may at any time thereafter be applied to such a migration image to convert it into a solvent wash-away image for use in the instant invention as illustrated in FIG. 1 on substrate 11 after the web has advanced through developing station 26. In this regard, it is further noted that the liquid solvent applied need not be insulating; conductive liquids may be used.

At stripping station 28, transfer member 42 in the form of a web is advanced from supply roll 44 around positioning roller 46 to takeup roll 48, web 42 being advanced around positioning roll 46 to present the surface of web 42 into preferably non-slipping pressure contact with substrate 11 carrying image portions 41 and background portions 40. Backing plate 50 optionally may be used to regulate and control the pressure of the contact of web 42 on particle carrying substrate 11. As will be seen, web 42 and substrate 11 may be opaque in various colors, translucent or transparent depending on the mode of operation and the ultimate use of the web.

The transfer member 42 generally comprises a material having a surface either capable of being rendered tacky as by the application of heat, solvents or the like with or without the accompanying pressures or having a surface which is tacky such as an adhesively coated surface, for example, pressure sensitive adhesive tapes. The web is applied, with the adhesive surface against particle carrying substrate 11, for example, by means of roller 46. After application, the tape is separated from substrate 11 and according to the optimum embodiment hereof the negative, background portions 40 adhere in image configuration to the surface of web 42, upon stripping, being cleanly released from substrate 11, with positive image portions 41 remaining on the substrate 11.

Any suitable adhesively surfaced web 42 may be used. Typical such webs include polyethylene terephthalate polyester film backed tapes, cellophane and acetate based tapes such as Scotch brand Magic Transparent Tape No. 810 available from the 3M Company (all the foregoing being preferred for transparency formation), commercially available masking tapes and similar adhesive webs. However, surfaces such as dye transfer paper, Cronar (Mylar overcoated with a hydrophilic gelatin like layer) film from Du Pont and heat activated hot-melt adhesives were found to be preferred because they exhibited less adhesiveness than many commercially available adhesive tapes which permitted the preferred selective stripping of either portions 41 or 40 simultaneously creating complementary positive and negative images on two separate surfaces.

It is preferred that the thickness of substrate 11 and web 42, if the images formed on the surfaces are to be used other than a light absorbing directly viewable image, for example as a transparency, be kept relatively thin, on the order of about 3 mils or less in order not to adversely effect image resolution upon transmission of the image. For lower resolution films of course, the films may be thicker up to about 1/10 inch thick. Of course, it should be appreciated that FIG. 1 is an illustrative embodiment and that the basic process need not be automated and that the transfer member, illustratively web 42, to be contacted with image carrying substrate 11 after development at developing station 26, need not be a thin layer but may comprise a solid member such as wood, plastic elements, metals and the like, of course, which limits the resulting image carried on this member to a directly viewable light absorbing image. Preferably if this support base serving the same purpose as web 42, is not transparent as when a thick metal member is employed, the image produced should contrast with the surface for easier viewing.

The invention hereof, by the proper selection of materials; specifically substrate 11, transfer member 42 and the particles and the material of layer 12 making up the image and background portions; may be adapted to the production of lithographic masters for the making of multiple copies. By choosing a hydrophilic substrate such as aluminum (preferably anodized) or aluminized Mylar and hydrophobic particles in the soluble binder of layer 12, which particles are wetted by lithographic inks, after stripping, the image or background pattern of particulate material left on the substrate may be used as a lithographic master. Likewise by choosing a hydrophilic transfer member 42, the image or background pattern of particles transferred to the transfer member after stripping may also be used as a lithographic master. Any suitable hydrophilic substrate 11 may be used in the makeup of member 10, such as certain plastics, gelatin coated plastics, thin sheets of metal and surface oxidized metal or laminates thereof, including such metals as aluminum, steel, zinc, magnesium, chromium and copper. Any suitable hydrophobic lithographic ink wettable particulate material may be chosen from those materials described herein, to make up the particles in the soluble binder of layer 12 including various resinous and waxy materials. Any suitable wet-out or fountain solution and lithographic printing ink, such as those described in copending application Ser. No. 633,916, filed Apr. 26, 1967, now U.S. Pat. 3,554,125, may be employed in using the strip images of this invention as lithographic masters.

Of course, suitable hydrophobic lithographic ink wettable substrate materials and transfer members such as Mylar poleyster film may also be used with suitable hydrophilic particles such as electrically photosensitive zinc oxide, to produce lithographic masters according to this invention.

The following examples further specifically define the present invention with respect to the use of binder migration imaging members and stripping techniques with the migration imaging system described herein to form complementary positive and negative images. The parts and percentages are by weight unless otherwise indicated. The examples below are intended to illustrate various preferred embodiments of the strip imaging system of this invention.

Example I

A dispersion is made up of about 1.25 parts of X-form metal-free phthalocyanine, prepared as described in Byrne et al. Pat. 3,357,989; about 0.80 part of Watchung Red B, an azo dye from Du Pont; about 0.90 part of Algol G.C., C.I. No. 67300 available from General Dyestuffs; about 8.85 parts of a polystyrenevinyl toluene copolymer available under the designation Piccotex 100 from Pennsylvania Industrial Chemical Corp., and about 40 parts of xylene. The dispersion is ball milled on a paint shaker in a four ounce jar with about 20 parts of 1/8 inch steel balls for about 2 hours and then ultrasonically dispersed for about five minutes just prior to coating.

The dispersion is coated with a No. 6 wire wound draw down rod available from Research Specialities Co., of Webster, N.Y., onto about 1 mil thick Mylar polyester film from Du Pont and dried in air to give a thickness of about 2 microns.

The member is imaged by uniformly electrostatically charging it by the double sided corona technique to a surface potential of about +1,000 volts, exposing the charged member to a positive (dark characters on a lighter background) optical image including line copy with exposure in illuminated areas of the member being about 2 f.c.s., the light source being a tungsten lamp with a color temperature of about 3200° K.

The image is developed by immersing the member in trichlorethylene liquid solvent for the Piccotex 100 for about three seconds to produce a positive image on the Mylar base of a density of about 1.0 in image areas with a commercially unacceptable high background density of about 0.5, where $D$ (density)=log $1/R$ where R equals the ratio of transmitted light to incident light.

A transfer member is then prepared by coating a hot melt adhesive onto Plestar polycarbonate film from Ansco Div. of General Aniline & Film Corp., the hot melt made up of about 67% of the vinyl acetate polymer Gelva V–7 from Monsanto Chemical Co., about 22% dibutyl phthalate and about 11% ethyl cellulose N–7 from Hercules Powder Co. The melt is coated at a temperature of about 170° C. where its viscosity is about 2500 cps, and dried in air to form an about 5 micron thick transparent adhesive layer on the Plestar film.

The imaged member and the adhesively coated Plestar are then passed (adhesive melt against the particle image on the Mylar) in a sandwich between about a 2 inch diameter roller and a pressure plate at a rate of about one/inch per second with a force on the roller of about 175 lbs./linear inch with the roller heated to about 150° C.

The sandwich is stripped apart after partial cooling to yield cleanly separated complementary positive and negative images, the positive image of the original left behind on the Mylar substrate with the complementary, negative background portions being transferred to the adhesive transfer member.

This surprising selective transfer phenomenon has defied any reasonably acceptable theoretical explanation.

The positive image left on the Mylar substrate has a resolution exceeding 57 line pairs per millimeter and is a directly viewable image which also may be used as a projection transparency. The negative image of the original transferred to the adhesive transfer member is a directly viewable image of lower density which may also be used as a projection transparency.

Example II

Example I is followed except that the transfer member is about a 4 mil thick sheet of gelatin coated Cronar film, which has its surface moistened with water before being pressed against the imaged member. The two layers are then rolled between about a 2 inch diameter roller and a pressure plate at a rate of about 3–4 inches per second with a force on the roller of about 25 lbs./linear inch with the roller heated to about 60° C.

The two layers are stripped apart to yield cleanly separate complementary positive and negative images, a negative background image of the original corresponding to the background is left behind on the Mylar imaging sheet with the complementary, higher-density positive image of the original being transferred to the Cronar adhesive transfer member. The image on the transfer member is substantially free of all background to produce a high density, high contrast image on which fine detail can be resolved at about 65 lp./mm. The positive image on the transfer member may be viewed directly or enlarged by projection in a slide projector.

The negative image corresponding to the background portions of migrated particles, left on the Mylar imaging sheet is a less dense but still highly visible image with high resolution of about 65 lp./mm. which may also be used as a projection transparency.

Examples III and IV

Examples I and II are followed, respectively, except that the substrate of the imaging member is Mylar polyester film with a semi-transparent overlayer of aluminum, about 75% transparent to white light. The members are charged to a positive surface potential of about 50 volts.

The imaged substrate members, used as transparencies, exhibit somewhat lower contrast than the corresponding members produced in Examples I and II because the Mylar substrate of Examples III and IV is about 30% less transparent in non-image areas, due to the aluminized layer. The imaged transfer members are equivalent in contrast to those described previously in Examples I and II. Image sense is as described in Examples I and II, respectively.

Example V

A coating dispersion is prepared by combining about one gram of X-form metal-free phthalocyanine, about 3 grams of Piccopale 70 SF, an unsaturated hydrocarbon from Pennsylvania Industrial Chemical Corp., about 10 grams of Isopar G (a long chain saturated aliphatic hydrocarbon liquid, boiling point 315–350° F. from Humble Oil and Chemical Co.), and about 20 grams of 1/8 inch steel balls in a 2 ounce jar and agitating vigorously on a paint shaker for about 30 mintues.

After removing the steel balls, the dispersion is coated onto a 5 mil bright aluminum sheet with a No. 5 wire wound rod and dried in air to give a dried thickness of about 9 microns.

The member is imaged by uniformly electrostatically charging it to a surface potential of about +500 volts, exposing the charged member to a positive optical image including line copy with exposure in illuminated areas of the member being about 0.3 f.c.s., the light source being a tungsten lamp of a color temperature of about 3400° K.

The image is developed by immersing the member in xylene, which is a good solvent for the Piccopale resin, for about 3 seconds to produce a positive image of the positive original, with considerable background (background density about 0.4) surrounding the image portions (image density about 1.2).

A Mylar transfer member coated with about 0.5–1.0 micron of Piccopale 70 SF resin is then pressed against the image member and the sandwich is passed between about a 2 inch diameter roller and a pressure plate at a rate of about 0.9 inch per second with a force on the roller of about 25 lbs./linear inch with the roller heated to about 55° C. The sandwich is stripped apart to yield a cleanly stripped positive image on the Mylar and a complementary negative image corresponding to background portions on the aluminum sheet.

The positive image which has been previously transferred to the Mylar may now be used as a duplicating master for "single fluid lithography" with transfer of multiple images to plain paper. This is done very simply by wetting the Mylar with the image upon it with a water based ink, for example Scripto permanent black ink from the Sheaffer Pen Company, Ft. Madison, Iowa. The pigment pattern, being relatively hydrophilic, is wetted by the ink, while the Piccopale coated Mylar surface surrounding the pigment image, being relatively hydrophobic, is not wetted by the water based ink.

A multiplicity of lithographic copies are produced using both the negative imaged aluminum substrate and the positive imaged Mylar transfer member support as lithographic masters.

Example VI

Example V is followed, except that the substrate for the imaging member is about a 4 mil thick film of Cronar instead of the aluminum and double corona charging is used.

A multiplicity of lithographic copies are produced using both the negative imaged Cronar and the positive imaged Mylar transfer member support as lithographic masters.

Example VII

Example VI is followed except that gelatin coated Kodak dye transfer paper is substituted for the Cronar film.

Although specific components and proportions have been stated in the above particularized description of preferred embodiments of the imaging system of this invention, other suitable materials as listed herein may be used with similar results. In addition, other materials may be added to materials listed herein or variations may be made in the various processing steps described to synergize, enhance or otherwise modify the invention. For example, various dyes, solvents, plasticizers and moisture and other "proofing" agents may be added to the soluble binder of layer 12.

Also, a thin layer of a release agent between the substrate and layer 12 may be used to facilitate the selective release of migrated particles from the substrate. Also, a layer of soluble material may be interlayered between the substrate and layer 12.

It will be understood that various other changes in the details, materials, steps and arrangements of parts which have been herein described and illustrated in order to explain the nature of the invention will occur to and may be made by those skilled in the art upon a reading of this disclosure and such changes are intended to be included within the principle and scope of this invention.

What is claimed is:

1. In an imaging method comprising the steps of:

(a) providing an imaging member comprising a layer comprising migration particles dispersed in a solvent soluble electrically insulating binder;

(b) forming an electrical latent image on said member;

(c) applying a solvent for said solvent soluble electrically insulating binder to said member while said member resides on a substrate wherein said solvent is sufficiently electrically insulating to prevent the migration particles from losing their charge before migration and wherein said particles are not entirely soluble in said solvent whereby said electrically insulating binder material is removed from said substrate and some particles are deposited on said substrate in image configuration and other particles are deposited in a lesser amount on said substrate in background configuration;

the improvement comprising:

(d) pressing an adhesive transfer member into contact against the image and background bearing substrate; and (e) separating said transfer member and said image and background bearing substrate whereby one, but not both, of the image pattern and the background pattern of migrated particles is selectively released from substrate and is transferred to said transfer member.

2. An imaging method according to claim 1 wherein said particles are from about 0.01 to about 3.0 microns in size and wherein said particles are substantially uniformly dispersed throughout said binder.

3. An imaging method according to claim 2 wherein said particles are electrically photosensitive and said latent image is formed by steps comprising uniformly electrostatically charging said member and exposing said member to an image pattern of activating electromagnetic radiation.

4. An imaging method according to claim 3 wherein said particles are photoconductive.

5. An imaging method according to claim 4 wherein said particles are selected from the group consisting of selenium, phthalocyanine and its metal derivatives and compounds represented by the following molecular structures

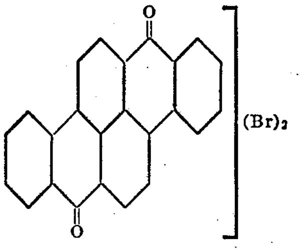

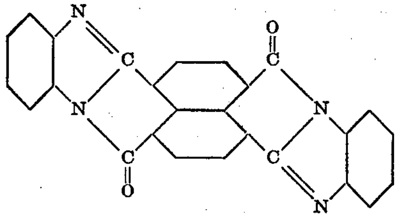

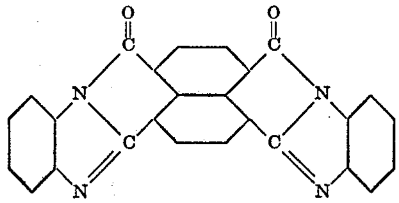

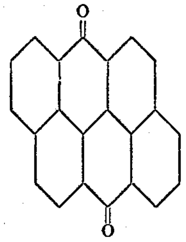

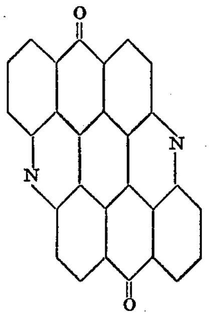

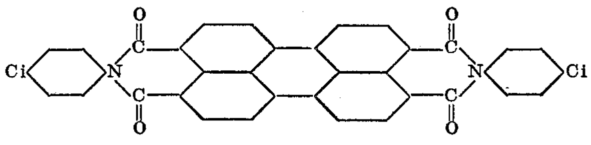

and mixtures thereof.

6. An imaging method according to claim 4 wherein said particles comprise X-form metal-free phthalocyanine.

7. An imaging method according to claim 1 wherein said substrate is electrically insulating and said layer comprising migration particles dispersed in a binder is formed on said substrate.

8. An imaging method according to claim 1 wherein said particles are hydrophobic and wettable by a lithographic ink and the surface of said substrate adjacent said soluble layer is hydrophilic.

9. An imaging method according to claim 8 wherein the surface of said transfer member contacted to the imaging member is hydrophilic.

10. An imaging method according to claim 1 wherein said particles are hydrophobic and wettable by a lithographic ink and the surface of said transfer member contacted to the imaging member is hydrophilic.

11. An imaging method according to claim 8 wherein said particles are photoconductive, range in size between about 0.01 to about 3 microns, are substantially uniformly dispersed throughout said binder and comprise phthalocyanine and its metal derivatives.

12. An imaging method according to claim 1 wherein said particles are hydrophilic and the surface of said substrate adjacent said soluble layer is hydrophobic and wettable by a lithographic ink.

13. An imaging method according to claim 1 wherein said particles are hydrophilic and the surface of said transfer member contacted to the imaging member is hydrophobic and wettable by a lithographic ink.

14. A method of making multiple copies from a lithographic duplicating master comprising the steps of:

(a) providing a lithographic duplicating master, of hydrophobic, lithographic ink wettable particles on a hydrophilic substrate as produced by claim 8;

(b) applying to the surface of said image bearing hydrophilic substrate a lithographic ink, said ink being distributed thereon conforming to said image pattern of particles;

(c) contacting said ink surface with a copy sheet thereby transferring an imprint of said image to said sheet; and (d) repeating steps (b) and (c) until the desired number of copies are produced.

15. A method of making multiple copies from a lithographic duplicating master comprising the steps of:

(a) providing a lithographic duplicating master, of hydrophobic, lithographic ink wettable particles on a hydrophilic transfer member surface as produced by claim 10;

(b) applying to the surface of said image bearing hydrophilic transfer member surface a lithographic ink, said ink being distributed thereon conforming to said image pattern of particles;

(c) contacting said ink surface with a copy sheet thereby transferring an imprint of said image to said sheet; and, (d) repeating steps (b) and (c) until the desired number of copies are produced.

16. A method of making multiple copies from a lithographic duplicating master comprising the steps of:

(a) providing a lithographic duplicating master, of hydrophilic water based ink wettable particles on a relatively hydrophobic substrate as produced by claim 12;

(b) applying to the surface of said image bearing hydrophobic substrate a water based ink, said ink being distributed thereon conforming to said image pattern of particles;

(c) contacting said ink surface with a copy sheet thereby transferring an imprint of said image to said sheet; and (d) repeating steps (b) and (c) until the desired number of copies are produced.

17. A method of making multiple copies from a lithographic duplicating master comprising the steps of:

(a) providing a lithographic duplicating master, of hydrophilic water based ink wettable particles on a relatively hydrophobic transfer member surface as produced by claim 13;

(b) applying to the surface of said image bearing hydrophobic transfer member surface a water based ink, said ink being distributed thereon conforming to said image pattern of particles;

(c) contacting said ink surface with a copy sheet thereby transferring an imprint of said image to said sheet; and (d) repeating steps (b) and (c) until the desired number of copies are produced.

18. An imaging method according to claim 2 wherein said background pattern is transferred to said transfer member upon completion of said separating step.

19. An imaging method according to claim 2 wherein said layer is between about 1/4 to about 5 microns thick.

20. An imaging method according to claim 1 wherein said transfer member is adhesively surfaced on that surface pressed into contact with said image and background bearing substrate.

References Cited

UNITED STATES PATENTS

| | | | |
|---|---|---|---|
| 3,275,436 | 9/1966 | Mayer | 96—1.4 X |
| 3,427,242 | 2/1969 | Mihajlov | 96—1.3 X |
| 3,438,772 | 4/1969 | Guldlach | 96—1.3 X |
| 3,444,369 | 5/1969 | Malineric | 96—1 X |
| 3,446,616 | 5/1969 | Clark | 96—28 X |

GEORGE F. LESMES, Primary Examiner

R. E. MARTIN, Assistant Examiner

U.S. Cl. X.R.

96—1, 1.5, 28, 33; 117—1.7, 17.5